US007324878B2

(12) United States Patent
Imai et al.

(10) Patent No.: US 7,324,878 B2
(45) Date of Patent: Jan. 29, 2008

(54) METHOD AND APPARATUS FOR DISPLAYING INFORMATION FOR VEHICLE, AND COMPUTER PRODUCT

(75) Inventors: Kazushige Imai, Tokyo (JP); Isao Nomura, Tokyo (JP)

(73) Assignees: Pioneer Corporation, Tokyo (JP); Pioneer Design Corporation, Tokyo (JP)

(*) Notice: Subject to any disclaimer, the term of this patent is extended or adjusted under 35 U.S.C. 154(b) by 230 days.

(21) Appl. No.: 11/142,677

(22) Filed: Jun. 2, 2005

(65) Prior Publication Data
US 2005/0273216 A1    Dec. 8, 2005

(30) Foreign Application Priority Data
Jun. 2, 2004    (JP)    ............... 2004-164970

(51) Int. Cl.
*G06F 7/60*    (2006.01)
(52) U.S. Cl. ............................. 701/1; 362/23
(58) Field of Classification Search .............. 701/1, 701/36; 340/815.4, 815.47, 815.49, 466; 362/23, 37, 559; 116/28 R, 28.1, 35 R, 37
See application file for complete search history.

(56) References Cited

U.S. PATENT DOCUMENTS

| | | | | |
|---|---|---|---|---|
| 5,963,280 A * | 10/1999 | Okuda et al. | ................. | 349/65 |
| 6,009,355 A * | 12/1999 | Obradovich et al. | ........... | 701/1 |
| 6,144,424 A * | 11/2000 | Okuda et al. | ................. | 349/65 |
| 6,224,222 B1 * | 5/2001 | Inoguchi et al. | .............. | 362/29 |
| 6,641,502 B2 * | 11/2003 | Heim | ......................... | 477/37 |
| 6,662,100 B2 * | 12/2003 | Morita et al. | ............... | 701/200 |

\* cited by examiner

*Primary Examiner*—Dalena Tran
(74) *Attorney, Agent, or Firm*—Foley & Lardner LLP

(57) ABSTRACT

An apparatus for displaying information on a vehicle includes an information acquiring unit that acquires speed information of the vehicle and status information concerning a status of the vehicle, the status information including at least one of engine revolutions-per-minute information, slope information, acceleration information, angular-velocity information, lateral-gravity information, voltage information, direction information, time information, latitude and longitude information, torque information, and horse-power information; and a display control unit that controls a display screen in such a manner that the speed information and the status information acquired are displayed simultaneously.

11 Claims, 6 Drawing Sheets

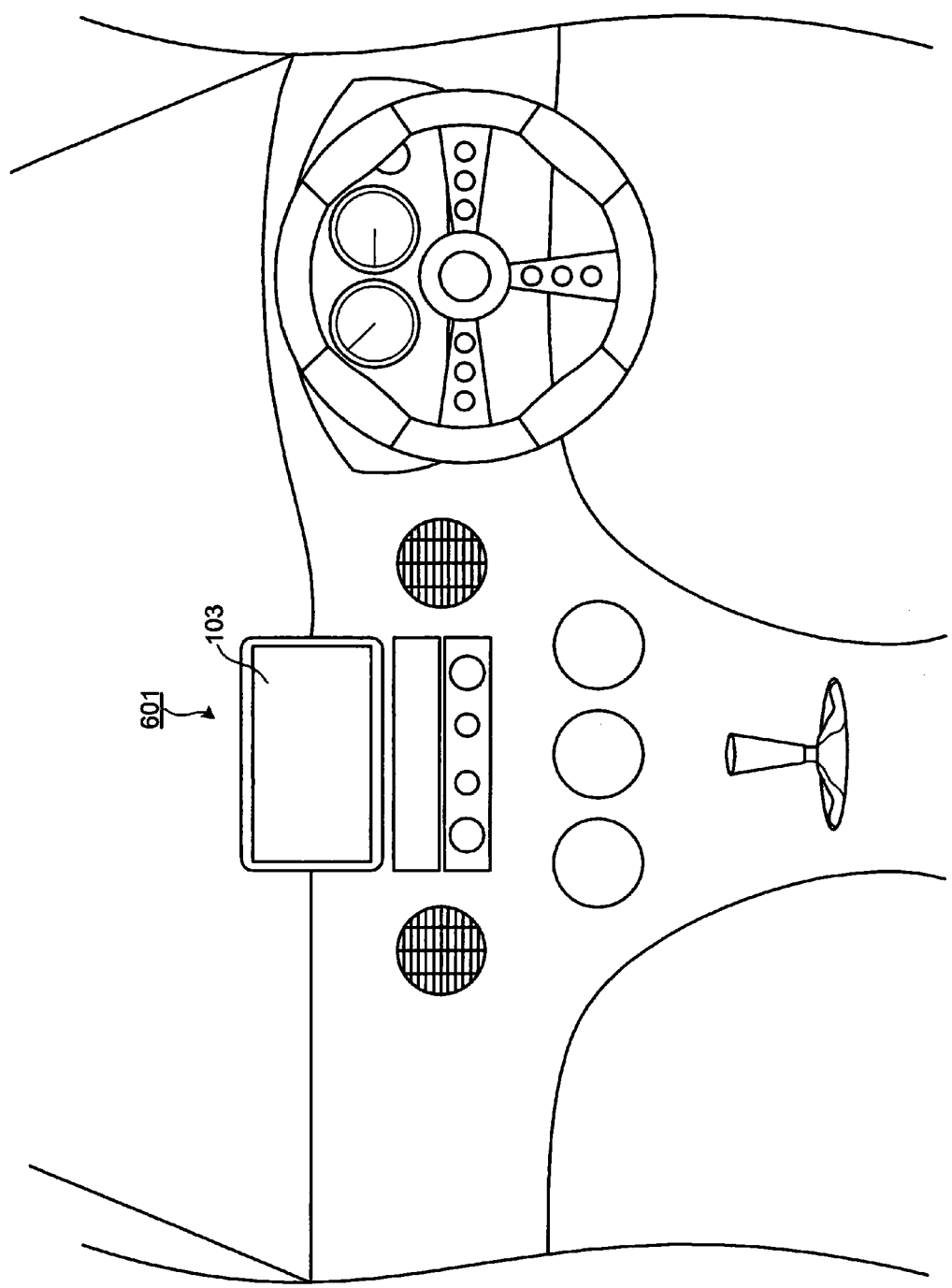

METHOD AND APPARATUS FOR DISPLAYING INFORMATION FOR VEHICLE, AND COMPUTER PRODUCT

BACKGROUND OF THE INVENTION

1. Field of the Invention

The present invention relates to a technology for displaying various types of information on a vehicle effectively.

2. Description of the Related Art

Conventionally, speed information of a vehicle and status information like revolutions-per-minute (RPM) of an engine has been displayed by separate displays (meters), respectively. In general, the displays have been set in front of a driver such that the driver can visually recognize the displays easily. In addition, a display screen for displaying map information has been provided in an in-vehicle navigation system.

However, in the conventional technology, the speed information and the status information are displayed independently from each other by the separate displays. Thus, a driver is required to be considerably experienced in order to intuitively recognize both the speed information and the status information simultaneously. When the driver attempts to check both the speed information and the status information, the driver has to focus a line of sight on the meters, respectively, which is likely to interfere with safe driving. When map information is not displayed in a vehicle mounted with the in-vehicle navigation system, the display screen is not used effectively, leading to lack of entertainment for a driver and a passenger.

SUMMARY OF THE INVENTION

It is an object of the present invention to solve at least the above problems in the conventional technology.

An apparatus for displaying information on a vehicle according to one aspect of the present invention includes an information acquiring unit that acquires speed information of the vehicle and status information concerning a status of the vehicle, the status information including at least one of engine revolutions-per-minute information, slope information, acceleration information, angular-velocity information, lateral-gravity information, voltage information, direction information, time information, latitude and longitude information, torque information, and horse-power information; and a display control unit that controls a display screen in such a manner that the speed information and the status information acquired are displayed simultaneously.

A method of displaying information on a vehicle according to another aspect of the present invention includes acquiring speed information of the vehicle and status information concerning a status of the vehicle, the status information including at least one of engine revolutions-per-minute information, slope information, acceleration information, angular-velocity information, lateral-gravity information, voltage information, direction information, time information, latitude and longitude information, torque information, and horse-power information; and controlling a display screen in such a manner that the speed information and the status information acquired are displayed simultaneously.

A computer-readable recording medium according to still another aspect of the present invention stores a computer program that causes a computer to execute the above method according to the present invention.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 6 is a schematic for illustrating an example of implementation of the information display apparatus according to the present embodiment.

DETAILED DESCRIPTION

Exemplary embodiments of a method and an apparatus for displaying information for a vehicle, and a computer product according to the present invention are explained in detail below with reference to the accompanying drawings.

Figure 1:
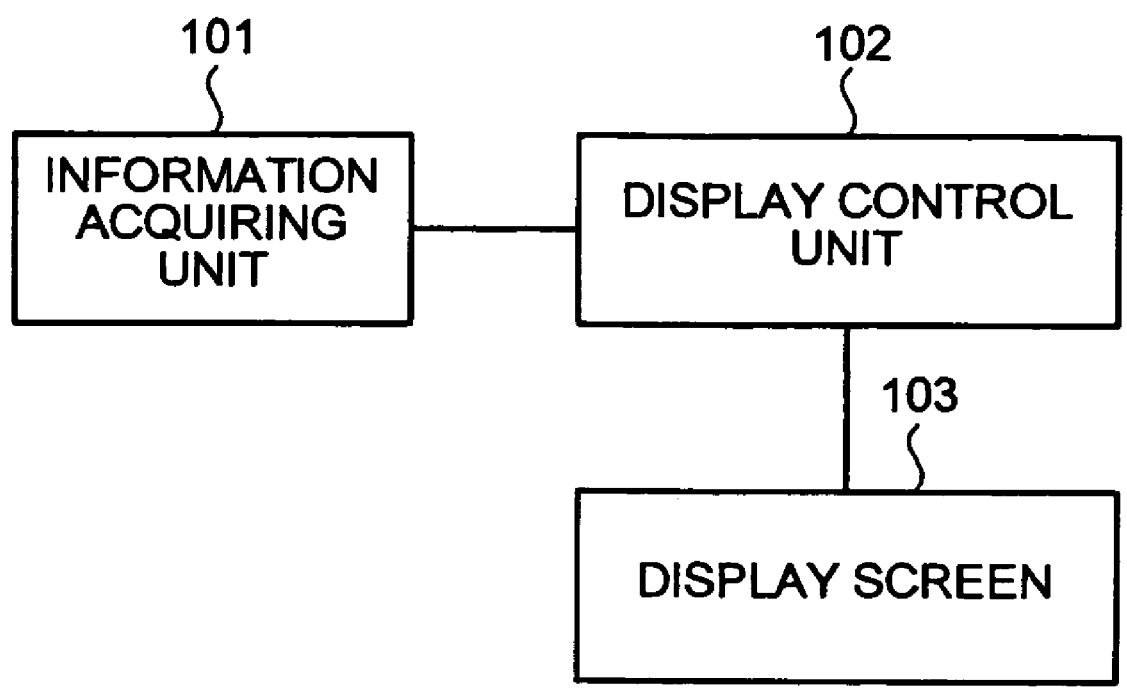
FIG. 1 is a block diagram for illustrating an example of a functional structure of an information display apparatus according to an embodiment of the present invention.

FIG. 1 is a block diagram for illustrating an example of a functional structure of an information display apparatus according to an embodiment of the present invention. The information display apparatus provided in a vehicle (including a four wheel car and a motorcycle) includes an information acquiring unit 101, a display control unit 102, and a display screen 103.

The information acquiring unit 101 acquires speed information of the vehicle and information on a status of the vehicle. The information on a status of the vehicle may be, for example, one of engine revolutions-per-minute information, slope information, acceleration information, angular-velocity information, lateral gravity information, voltage information, direction information, time information, latitude and longitude information, torque information, and horse power information or may be two or more of these kinds of information.

The display control unit 102 controls one display screen 103 to display the speed information and the status information, which are acquired by the information acquiring unit 101, simultaneously. Therefore, the display control unit 102 displays, for example, one of engine revolutions-per-minute information, slope information, acceleration information, angular-velocity information, lateral G information, voltage information, direction information, time information, latitude and longitude information, torque information, and horse power information or two or more of these kinds of information on the identical display screen 103.

In this way, it is possible to display the speed information of the vehicle, which is one of most important kinds of information during traveling, and the status information of the vehicle related to the speed information on the identical screen simultaneously. Thus, a driver can visually recognize these plural kinds of information simultaneously without moving a line of sight and without performing special operation and can check a relation between the speed information and the status information instantly even during traveling.

More specifically, the information acquiring unit 101 acquires at least one of engine revolutions-per-minute information, slope information, acceleration information, angular-velocity information, lateral G information, voltage information, torque information, and horse power information as the status information. Then, the display control unit 102 displays a substantially circular area on the display screen 103 and displays the speed information with a numeral in the substantially circular area. In addition, the display control unit 102 may display one of the engine revolutions-per-minute information, the slope information, the acceleration information, the angular-velocity information, the lateral G information, the voltage information, the torque information, and the horse power information or two or more of these kinds of information to surround a part of an outer periphery of the substantially circular area.

Therefore, the driver is not required to be conscious of the status information and can check the information unconsciously by looking at the speed information. Since speed of the vehicle is information that the driver frequently checks, the driver recognizes the speed intuitively with a numeral. For example, when the driver looks at a numeral "40", the driver can guess that this means "40 (km)" intuitively and understand that this is legal speed limit on general roads. When the driver looks at a numeral "80", the driver can guess that this means "80 (km)" intuitively and understand that this is legal speed limit on highways. In addition, depending on an individual difference of the driver, when the driver looks at a numeral "100" or more, the driver can easily judge that this is high speed. When "41 (km)" is displayed on the display screen 103 in a location where speed limit is "40 (km)", the driver easily judges that the speed is a little too high. Therefore, the driver can grasp a present status of speed of the vehicle instantly when the driver looks at speed displayed as a numeral.

On the other hand, in general, the status information is information that is checked less frequently compared with the speed information. The driver cannot recognize a status indicated by the status information intuitively with a numeral in some cases. If the status information is represented by a numeral in addition to the speed information, the driver confuses the status information with the speed information and cannot understand the status instantly. Therefore, the status information is displayed by analog display, that is, an amount of change in the status is graphically displayed without using a numeral. In this way, digital display (using a numeral) and analog display are mixed to display the speed information and the status information simultaneously, whereby the driver can check plural kinds of information instantly without confusing one kind of information with another.

The display control unit 102 may display the substantially circular area substantially in the center of the display screen 103. This causes the driver to recognize in advance that the substantially circular area is displayed in the center of the display screen 103. As a result, the driver can move a line of sight more instantly compared with the time when the substantially circular area is displayed in positions other than the center of the display screen 103.

The information acquiring unit 101 acquires one of slope information, acceleration information, angular-velocity information, lateral G information, voltage information, torque information, and horse power information or two or more of these kinds of information as the status information. The display control unit 102 displays amounts of change in a slope, acceleration, angular velocity, lateral G, voltage, torque, and horse power graphically using the analog display, that is, without using a numeral based on the status information such that the analog display changes dynamically in an up-to-down direction according to the amounts of change.

Consequently, for example, it is possible to change the analog display in the upward direction according to an increase in each of the amounts of change and in the downward direction according to a decrease in each of the amounts of change. Thus, the driver can recognize the increase and the decrease in the amounts of change intuitively. On the other hand, if the analog display is changed in a left-to-right direction, it may be difficult to recognize intuitively in which direction the analog display is changed when each of the amounts of change increases and in which direction the analog display is changed when each of the amounts of change decreases.

The display control unit 102 may display slope information and acceleration information substantially diagonal across the substantially circular area. Consequently, the driver can recognize three kinds of information, namely, speed, a slope, and acceleration, simultaneously and can recognize a relation between the slope and the acceleration sensibly.

The display screen 103 may be a display screen of an in-vehicle navigation system. When the display screen of the in-vehicle navigation system is used as the display screen 103, the display screen 103 does not have to be mounted separately in a vehicle provided with the in-vehicle navigation system. In addition, when the display screen of the in-vehicle navigation system is used, not only a driver but also a passenger in a passenger seat can easily check a displayed content. Thus, the passenger can easily navigate.

Therefore, it is possible to improve entertainment using the in-vehicle navigation system when a navigation function thereof is not used. In other words, the in-vehicle navigation system displays speed information and engine revolutions-per-minute information of a traveling vehicle simultaneously in stead of displaying map information. This allows a driver and a passenger to enjoy a drive more.

Figure 2:
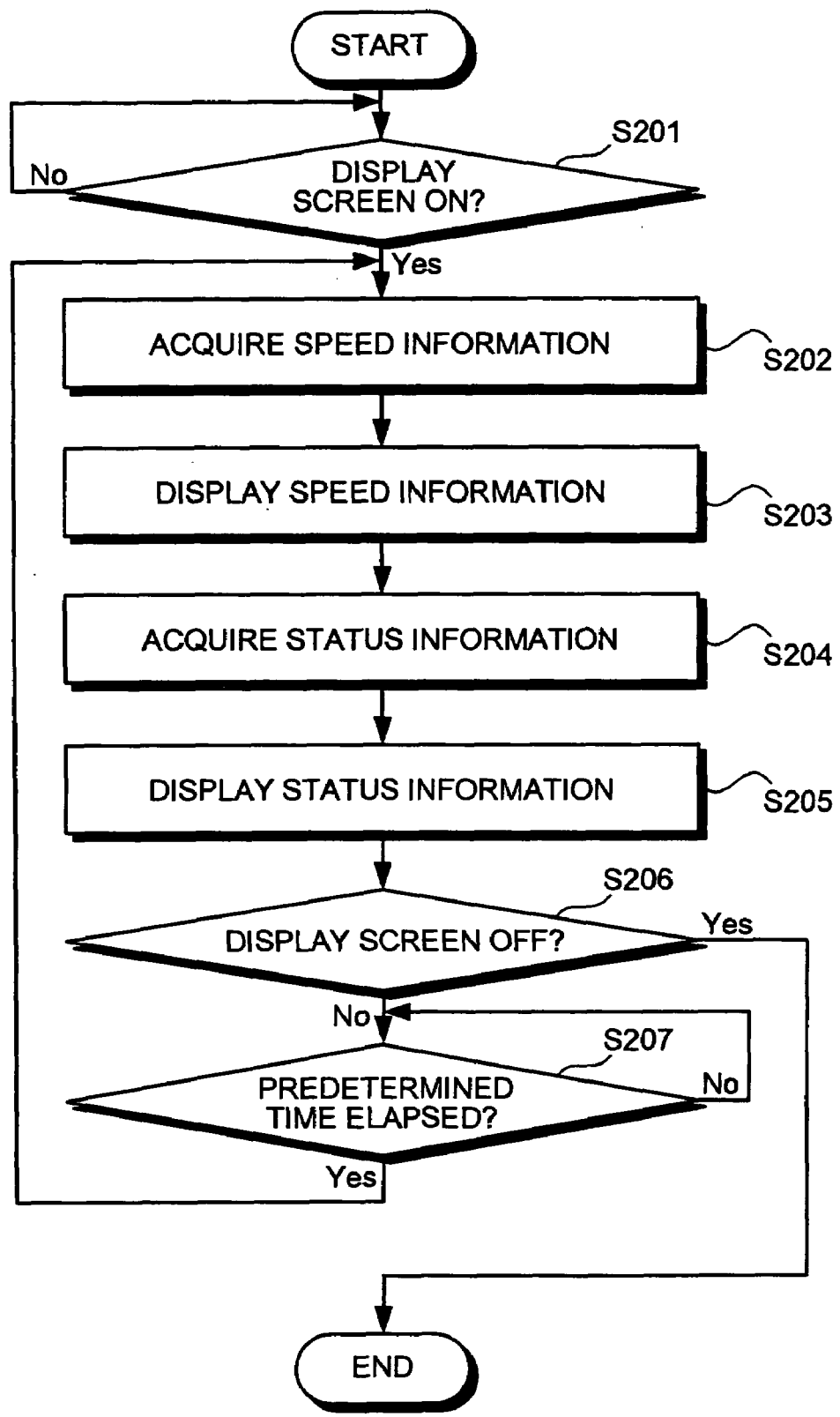
FIG. 2 is a flowchart of a processing performed by the information display apparatus according to the present embodiment.

FIG. 2 is a flowchart of a processing performed by the information display apparatus according to the present embodiment. The information display apparatus judges whether the display screen 103 is ON (step S201). When the display screen 103 is ON ("Yes" at step S201), the information display apparatus acquires speed information of a vehicle (step S202) and displays the acquired speed information in a predetermined area of the display screen 103 (step S203). In addition, the information display apparatus acquires state information such as engine revolutions-per-minute information, slope information, and lateral G information of the vehicle (step S204) and, as described above, displays the acquired state information in a predetermined area of the display screen 103 according to a display method decided in advance (step S205).

Next, the information display apparatus judges whether the display screen 103 is turned OFF (step S206). If the display screen 103 is not turned OFF ("No" at step S206), the information display apparatus judges whether a predetermined time (e.g., several milliseconds) has elapsed (step S207). If the predetermined time has elapsed ("Yes" at step S207), the information display apparatus returns to step S202 and repeats the acquisition and display of speed information and state information.

Through such processing, the information display apparatus can display the speed information and the status information, which change every moment, on the display screen 103. When the display screen 103 is turned OFF at step S206 ("Yes" at step W206), the information display apparatus ends the series of processing.

Figure 3:
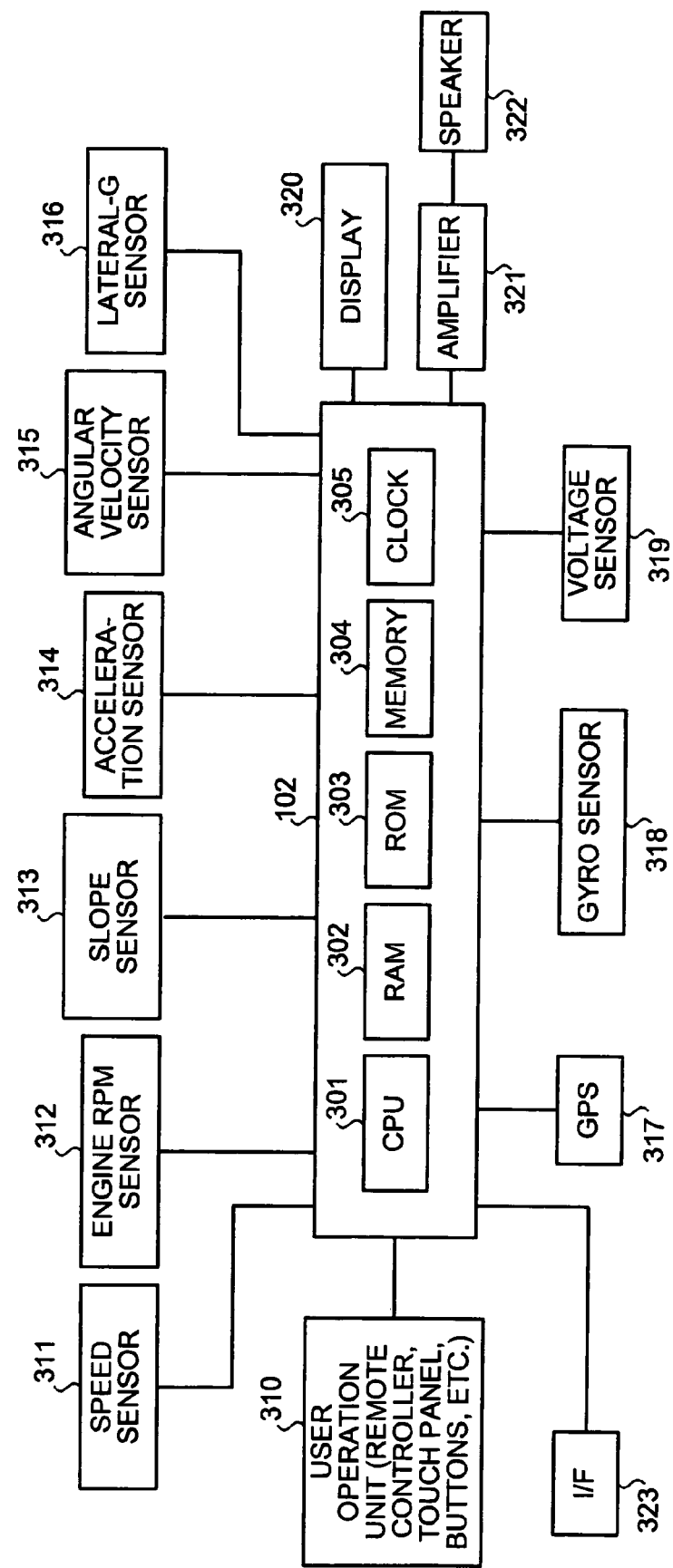
FIG. 3 is a block diagram for illustrating an example of a hardware constitution of the information display apparatus according to the present embodiment.

FIG. 3 is a block diagram for illustrating an example of a hardware constitution of the information display apparatus according to the present embodiment. The information display apparatus includes a central processing unit (CPU) 301 functioning as the display control unit 102, a random access memory (RAM) 302, a read only memory (ROM) 303, a memory 304, and a clock 305. A user operation unit 310, a speed sensor 311 that detects speed of a traveling vehicle, an engine RPM sensor 312 that detects an engine RPM of the vehicle, a slope sensor 313 that detects a slope of the vehicle, an acceleration sensor 314 that detects acceleration of the vehicle, an angular velocity sensor 315 that detects angular velocity of the vehicle during cornering, and a lateral G sensor 316 that detects lateral gravity, that is an outward force (gravity) caused by a centrifugal force, are connected to the display control unit 102.

In addition, a global positioning system (GPS) 317 that detects a position (latitude and longitude information) of a vehicle by receiving radio waves from an artificial satellite, a gyro sensor 318 that detects a traveling direction of the vehicle, and the voltage sensor 319 for an electric system of the vehicle are connected to the display control unit 102. The sensors 311 to 319 realize the functions of the information acquiring unit 101. A display 320 functioning as the display screen 103, an amplifier 321, and a speaker 322 are also connected to the display control unit 102.

Although not shown in the figure, the information display apparatus may include sensors that detect torque (torque is a force for rotating a shaft) information and horse power (horse power is numerical representation of work done by a horse) information.

The CPU 301 performs display control and also controls the entire information display apparatus. The RAM 302 is used as a work area of the CPU 301. The ROM 303 stores a basic processing program for the information display apparatus. The memory 304 stores various kinds of information. Specifically, for example, the memory 304 is a hard disk (HD). Alternatively, the memory 304 may be a detachable recording medium like a digital versatile disk (DVD) or a compact disk (CD). The clock 305 counts the present time, and stores information on the present time.

A function of the user operation unit 310 is realized by a touch panel, a remote controller, buttons provided in the information display apparatus, or the like. Specifically, the display 320 includes a liquid crystal display or an organic electroluminescence (EL) display. A communication interface (I/F) 323 performs data communication with a communication device on the outside by radio.

Although not shown in the figure, the information display apparatus may include a map database (DB), a navigation control unit, a position recognizing unit, a guide sound output unit, a point searching unit, a route acquiring unit, a route guiding unit, and a guide sound generating unit that are provided in a general in-vehicle navigation system.

The navigation control unit informs the display 320 which location on a map a vehicle is traveling based on own vehicle location information calculated by the position recognizing unit and the map DB.

The guide sound output unit controls output to one or plural speakers 322 using the amplifier 321 to thereby reproduce a guide sound.

The point searching unit searches for an arbitrary point based on information inputted from the user operation unit 310 and outputs the point to the display 320. The route acquiring unit calculates an optimum route to the point based on point information obtained by the point searching unit. The route guiding unit generates route guidance information on a real time basis based on information obtained by the route acquiring unit and the own vehicle location information.

The guide sound generating unit generates data of a tone and a sound corresponding to a pattern. In other words, the guide sound generating unit sets a virtual sound source corresponding to a guide point and generates sound guidance information based on route information and outputs the sound guidance information to the guide sound output unit.

Figure 4:
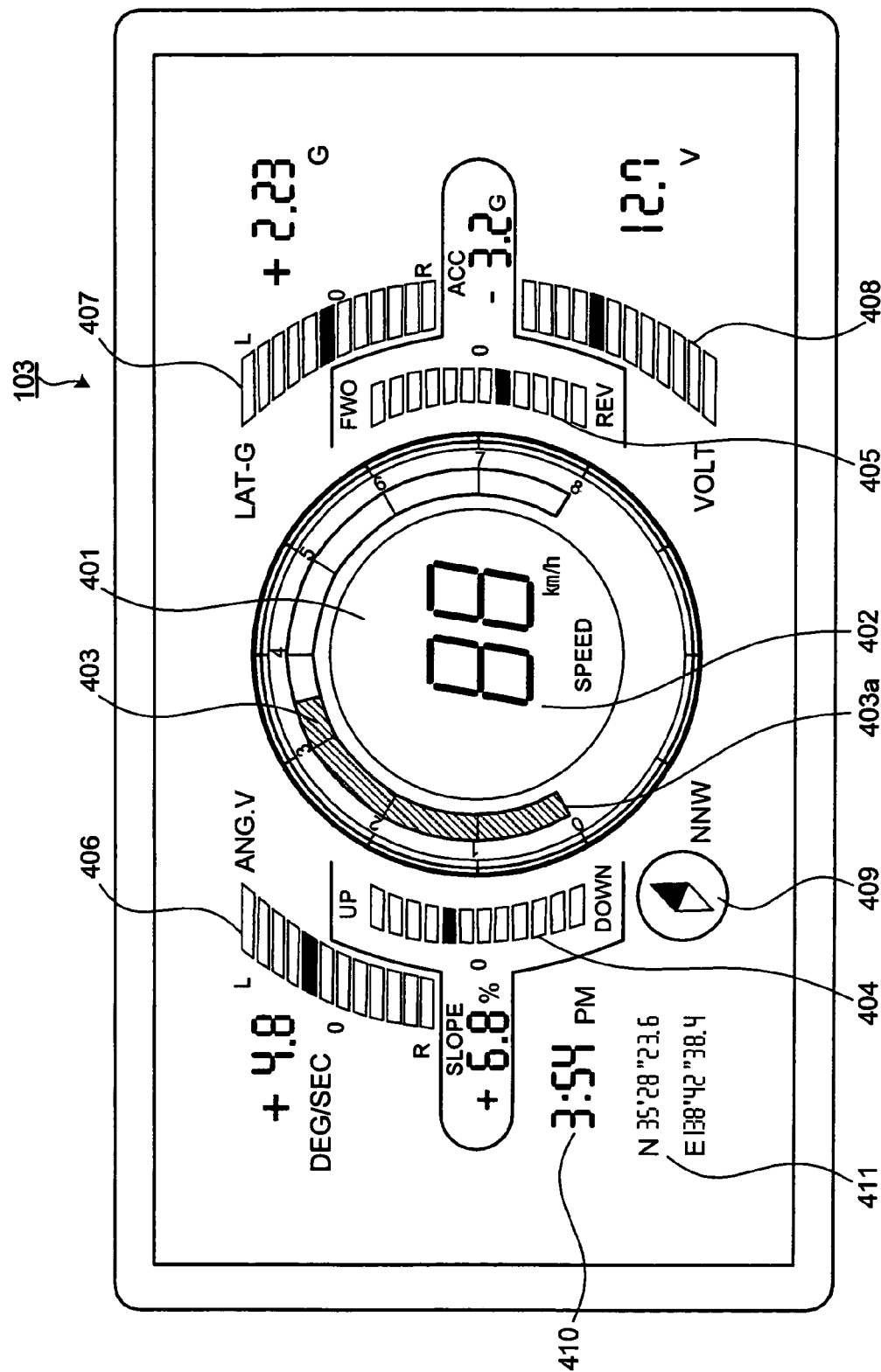
FIG. 4 is a schematic for illustrating an example of a content displayed on a display screen of the information display apparatus according to the present embodiment.
Figure 5:
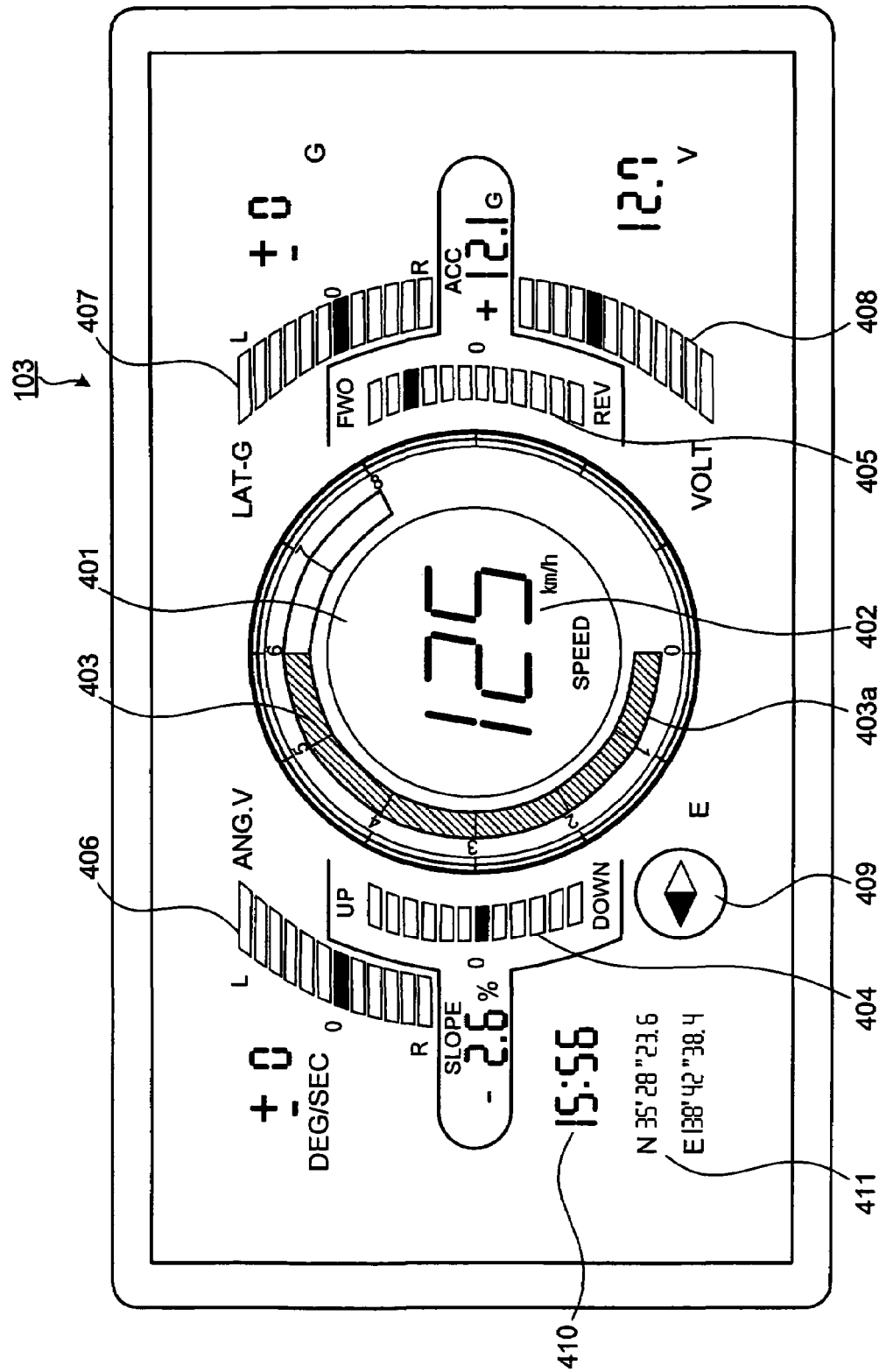
FIG. 5 is a schematic for illustrating another example of the content displayed on the display screen of the information display apparatus according to the present embodiment.

FIGS. 4 and 5 are schematics for illustrating contents displayed on a display screen of the information display apparatus according to the present embodiment.

The information display apparatus acquires status information of the vehicle (step S204) and displays the acquired status information in a predetermined area of the display screen 103 (step S205). In the display screen 103 shown in FIG. 4, reference numeral 401 denotes a substantially circular area, which is displayed substantially in the center of the display screen 103. Information on speed of a vehicle (speed information, SPEED) 402 is displayed in this substantially circular area 401. In FIG. 4, it is seen that the speed information 402 indicates '88 km/h'. On the other hand, in FIG. 5, it is seen that the speed information 402 indicates '125 km/h'.

Reference numeral 403 denotes information on engine RPM of the vehicle (RPM), which is displayed along a circumference of the substantially circular area 401. In the RPM 403, numerals from "0" to "8" are displayed and indicate engine RPM. "1" indicates 1000 rpm and "8" indicates 8000 rpm. A display color of a display area section 403a changes according to the engine RPM. In FIG. 4, the color changes in the middle between "3" and "4", from which it is seen that the present engine RPM is about 3,500 rpm.

If a driver knows that the RPM 403 is "4", that is, 4000 rpm when a boundary of change of the display color is substantially at the top of the substantially circular area, the driver can see intuitively how low (high) engine RPM is with respect to 4000 rpm simply by checking speed in the SPEED 402 without specifically paying attention to the RPM 403. Therefore, the driver can check a relation between the speed and the engine RPM instantly. As a result, the driver can perform selection of shift or the like easily.

Note that, in FIG. 4, "4" is set substantially at the top of the substantially circular area. However, the other numerals may be set at substantially the top of the substantially circular area. The driver only has to select a numeral arbitrarily based on engine RPM of the vehicle. For example, if engine RPM serving as timing for shift change is set substantially at the top of the substantially circular area, the driver can recognize the timing for shift change intuitively. In FIG. 5, "6" is set substantially at the top of the substantially circular area.

Reference numeral 404 denotes slope information (SLOPE), which is displayed on the outer side of the RPM 403 to surround a part of the outer periphery of the substantially circular area 401. Reference numeral 405 denotes acceleration (ACC), which is displayed on the outer side of the RPM 403 to surround a part of the outer periphery of the substantially circular area 401 in the same manner as the SLOPE 404. The SLOPE 404 and the ACC 405 are displayed to be substantially symmetrical across the substantially circular area 401. In other words, the SLOPE 404 is located on the left side and the ACC 405 is located on the right side.

The SLOPE 404 and the ACC 405 are displayed by, for example, arranging lateral rectangles in total twelve stages, which include six positive stages in the upward direction and six negative stages in the downward direction with "0" in the middle in the vertical direction (by a so-called digital gauge mode). Display colors of the rectangles are changed, whereby the driver can learn amounts of change in the SLOPE 404 and the ACC 405. In the SLOPE 404, the display changes to an upper side (UP) as a slope increases in an uphill road and changes to a lower side (DOWN) as the slope decreases in a downhill road. Similarly, in the ACC 405, the display changes to an upper side (FWO) as the vehicle is accelerated and changes to a lower side (REV) as the vehicle is decelerated.

The number of the rectangles is not limited to the number described above and only has to be set appropriately taking into account easiness to see. Therefore, for example, length of a bar may be changed as in a bar graph without displaying rectangles at all (without using the so-called digital gauge mode).

In the SLOPE 404 and the ACC 405, digital display is also performed together with analog display. In FIG. 4, '+6.8 (%)' is displayed on the outer side (the left side) of "0" in the middle of the SLOPE 404. Similarly, '−3.2 (G)' is displayed on the outer side (the right side) of "0" in the middle of the ACC 405. On the other hand, in FIG. 5, '−2.6 (%)' is displayed on the outer side (the left side) of "0" in the middle of the SLOPE 404. Similarly, '+12.1 (G)' is displayed on the outer side (the right side) of "0" in the middle of the ACC 405.

Reference numeral 406 denotes angular-velocity information (ANG. V), which is displayed on the outer side of the SLOPE 404 to surround a part of the outer periphery of the substantially circular area 401. Reference numeral 407 denotes lateral G information (LAT-G), which is displayed on the outer side of the ACC 405 to surround a part of the outer periphery of the substantially circular area 401. The ANG. V 406 and the LAT-G 407 are displayed to be substantially symmetrical across the substantially circular area 401. For example, the ANG. V 40 is displayed to be located on the left side and the LAT-G 407 is displayed to be located on the right side.

The ANG. V 406 and the LAT-G 407 are displayed by arranging lateral rectangles in total twelve stages, which include six left (L) stages in the upward direction and six right (R) stages in the downward direction with "0" in the middle, in a vertical direction. Display colors of the rectangles are changed, whereby the driver can learn amounts of change of the ANG. V 406 and the LAT-G 407. In the ANG. V 406, the display changes to an upper side (L) as angular velocity on the left side of the vehicle increases. Conversely, the display changes to a lower side (R) as angular velocity on the right side of the vehicle increases. Similarly, in the LAT-G 407, the display changes to an upper side (L) as lateral G on the left side of the vehicle increases and changes to a lower side (R) as lateral G on the right side of the vehicle increases.

The number of the rectangles is not limited to the number described above and only has to be set appropriately taking into account easiness to see. Therefore, for example, length of a bar may be changed as in a bar graph without displaying rectangles at all (without using the so-called digital gauge mode).

In the ANG. V 406 and the LAT-G 407, digital display is also performed together with analog display. In FIG. 4, '+4.8 (DEG/SEC)' is displayed near the ANG. V 406. Similarly, '+2.23 (G)' is displayed near the LAT-G 407. On the other hand, in FIG. 5, '±0 (DEG/SEC)' is displayed near the ANG. V 406. Similarly, '±0 (G)' is displayed near the LAT-G 407.

Reference numeral 408 denote voltage information (VOLT), which is displayed on the outer side of the ACC 405 and below the LAT-G 407 to surround a part of the outer periphery of the substantially circular area 401. In the VOLT 408, the display changes to an upper side as a voltage increases and changes to a lower side as a voltage decreases. In the VOLT 408, digital display is performed together with analog display. '12.7 (V)' is displayed near the VOLT 408.

Reference numeral 409 denotes direction information, which indicates a traveling direction with display of a compass and an initial letter indicating a direction. In FIG. 4, a top of the compass is the north and it is seen from inclination of the compass and an initial letter 'NNW' that a traveling direction is the north by northwest. In FIG. 5, it is seen from inclination of the compass and an initial letter 'E' that a traveling direction is the east.

Reference numeral 410 denotes time information. In FIG. 4, the time information 410 indicates present time '3:54 (PM)' with the digital display. The time information 410 may be indicated by 24-hour display or may be indicated by an analog clock. In FIG. 5, the time information 410 is indicated by the 24-hour display ('15:56'). Reference numeral 411 denotes latitude and longitude information. In FIG. 4, the latitude and longitude information 411 indicates a present position 'N35'28"23.6' 'E138'42"38.4' acquired from a global positioning system (GPS) with the digital display.

Although not shown in the figure, the information display apparatus may display torque (torque is a force for rotating a shaft) information and horse power (horse power is numerical representation of work done by a horse) information. The torque information and the horse power information may be displayed to surround a part of the outer periphery of the substantially circular area 401 and to be changed dynamically in the up-to-down direction in the same manner as the voltage information (VOLT) 408. In this case, the torque information and the horse power information may be provided in an outer periphery of, for example, the angular-velocity information (ANG. V) 406, the lateral G information (LAT-G) 407, or the voltage information (VOLT) 408 or may be displayed instead of one of the angular-velocity information (ANG. V) 406, the lateral G information (LAT-G) 407, and the voltage information (VOLT) 408.

FIG. 6 is a schematic for illustrating an example of implementation of the information display apparatus according to the present embodiment. As shown in FIG. 6, an in-vehicle navigation system 601 is mounted between a driver seat and a passenger seat in a vehicle. A display of the in-vehicle navigation system 601 may be a display of an on-dashboard system or an in-dashboard system.

The display screen 103 may be a display screen of the in-vehicle navigation system 601. When the display screen of the in-vehicle navigation system 601 is used as the display screen 103, the display screen 103 does not have to be amounted in a vehicle provided with the in-vehicle navigation system 601. In addition, not only a driver but also a passenger in the passenger seat can check a content of display easily. Thus, the passenger can navigate easily.

In this way, map information is not required in the in-vehicle navigation system. Therefore, even if map information is not used or even in a region where map information is not provided, it is possible to improve entertainment using the in-vehicle navigation system when the navigation function is not used.

The in-vehicle navigation system may display information on display screens of in-vehicle navigation systems of other vehicles, in particular, other vehicles traveling before and behind the vehicle. Consequently, drivers and passengers of the other vehicles can learn speed information and status information of the vehicle easily.

The information display method according to the present embodiment may be a computer readable program prepared in advance and is realized by executing the program with a computer like a personal computer or a workstation including a server. This program is recorded in a computer readable recording medium like a hard disk (HD), a floppy disk (FD), a compact disk ROM (CD-ROM), a magneto-optical disk (MO), or a digital versatile disk (DVD) and read out from the recording medium by the computer to be executed. This program may be recorded in a transmission medium deliverable via a network such as the Internet.

As explained above, according to the example of the present invention, it is possible to acquire information on a traveling vehicle easily. In addition, since a driver can check plural kinds of information simultaneously without moving a line of sight, the driver can drive a vehicle more safely. Moreover, it is possible to improve entertainment during traveling using a display screen.

The present document incorporates by reference the entire contents of Japanese priority document, 2004-164970 filed in Japan on Jun. 2, 2004.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An apparatus for displaying information on a vehicle, the apparatus comprising:
   an information acquiring unit that acquires speed information of the vehicle and status information concerning a status of the vehicle, the status information including slope information and acceleration information; and
   a display control unit that controls a display screen in such a manner that the speed information and the status information acquired are displayed simultaneously, wherein
   the speed information is displayed in a substantially circular area on the display screen, and
   the slope information and the acceleration information are displayed substantially diagonal each other across the substantially circular area.

2. The apparatus according to claim 1, wherein
   the speed information is displayed in the substantially circular area with a numeral,
   the status information further includes at least one of engine revolutions-per-minute information, angular-velocity information, lateral-gravity information, voltage information, direction information, time information, latitude and longitude information, torque information, and horse-power information, and
   the status information is displayed surrounding a part of an outer periphery of the substantially circular area.

3. The apparatus according to claim 1, wherein the substantially circular area is displayed substantially in a center of the display screen.

4. The apparatus according to claim 1, wherein the display control unit controls the display screen in such a manner that a level of a display changes dynamically in an up-down direction according to amounts of changes in slope or acceleration based on the status information.

5. The apparatus according to claim 1, wherein the display screen is included in an in-vehicle navigation system.

6. A method of displaying information on a vehicle, the method comprising:
   acquiring speed information of the vehicle and status information concerning a status of the vehicle, the status information including slope information and acceleration information; and
   controlling a display screen in such a manner that the speed information and the status information acquired are displayed simultaneously, wherein
   the speed information is displayed in a substantially circular area on the display screen, and
   the slope information and the acceleration information are displayed substantially diagonal each other across the substantially circular area.

7. The method according to claim 6, wherein
   the speed information is displayed in the substantially circular area with a numeral,
   the status information further includes at least one of engine revolutions-per-minute information, angular-velocity information, lateral-gravity information, voltage information, direction information, time information, latitude and longitude information, torque information, and horse-power information, and
   the status information is displayed surrounding a part of an outer periphery of the substantially circular area.

8. The method according to claim 6, wherein the substantially circular area is displayed substantially in a center of the display screen.

9. The method according to claim 6, wherein the controlling includes controlling the display screen in such a manner that a level of a display changes dynamically in an up-down direction according to amounts of changes in slope or acceleration based on the status information.

10. The method according to claim 6, wherein the display screen is included in an in-vehicle navigation system.

11. A computer-readable recording medium that stores a computer program for displaying information on a vehicle, wherein the computer program causes a computer to execute
    acquiring speed information of the vehicle and status information concerning a status of the vehicle, the status information including slope information and acceleration information; and
    controlling a display screen in such a manner that the speed information and the status information acquired are displayed simultaneously, wherein
    the speed information is displayed in a substantially circular area on the display screen, and
    the slope information and the acceleration information are displayed substantially diagonal each other across the substantially circular area.

* * * * *